United States Patent Office 2,846,011
Patented Aug. 5, 1958

2,846,011

METHOD FOR PERFORATING WELL FORMATIONS

William D. Miller, Tulsa, Okla., assignor to Pan American Petroleum Corporation, a corporation of Delaware No Drawing. Application October 19, 1956
Serial No. 616,949

1 Claim. (Cl. 166—22)

This invention relates to a method for completing wells such as oil and gas wells wherein the productive formation is perforated to promote the flow of fluids from the formation into the well. More particularly, this invention concerns a method for controlling the loss of fluid from the well into the formation, immediately following the perforation step, with a minimum impairment of the permeability of the formation.

When the well casing and surrounding cement sheath are perforated it is customary to have the well filled with drilling fluid to control the high fluid pressure which may exist in the formation opposite the perforations. Recently it has been discovered that the presence of solid materials in the well fluids at the time of perforating impairs the efficiency of the perforations. The high pressure produced by the explosive charge in the perforating device causes well fluids to flow through the newly-formed perforations into the surrounding formations. This fluid intrusion produces a filter cake inside the perforations which may permanently plug the perforations. Because of their small particle size, dispersed clay solids are particularly likely to impair the final permeability of the formation. To overcome this difficulty, it has become common practice to replace the drilling mud with a fluid which is free of such plugging materials. Tests have demonstrated that highest perforating efficiencies, that is, the least impairment of formation permeability, are obtained when the well contains only gas at the time of perforating; however, it may be difficult to control the well pressure after perforation when there is no liquid in the well to counterbalance the formation pressure.

Liquids which have been used as perforating fluids are water, oil and oil base drilling fluids. The entire column of drilling fluid may be replaced with the perforating fluid or a quantity of the fluid may be placed in the well at the elevation of the zone to be perforated, with drilling fluid or other fluids containing insoluble solids filling the remainder of the well. In the latter case the slug of perforating fluid may be placed in the well with a dump bailer or discharge from a string of tubing at the desired level. To avoid mixing of this fluid with drilling fluid in the upper part of the well, the perforating fluid may have a density greater than that of the drilling fluid. The density of oil has been increased by the addition of a high-density solvent such as carbon tetrachloride or by the addition of a gelling agent such as napalm in combination with weighting agents such as barium sulfate, lead oxide and the like. Similarly, the density of water has been increased by the addition of a gelling agent such as starch and a weighting agent such as those mentioned above for use in oil. Oil base drilling fluids have been used to some extent as perforating fluids; however, the fluid loss additives, such as air-blown asphalt, are substantially insoluble in paraffinic oils. In view of this property, it is unlikely that there will be satisfactory cleaning of the perforations by the formation fluids. Additionally, plastic materials such as asphalt may be forced into the pores of the formation by the high differential pressure, making it particularly difficult to remove these plugging agents and restore permeability.

Although these clean fluids have improved the results of casing perforating, they have not completely avoided the plugging of the perforations and occasionally they have not controlled formation pressure. In the absence of materials which will form a filter cake in the perforations, there is a substantial loss of well fluids through the perforations. When all of the drilling fluid in the well is replaced with the perforating fluid, there may be sufficient loss of fluid to the formation to lose control of the well. On the other hand, when only a portion of the mud is replaced by a slug of the clean fluid spotted adjacent the formation to be perforated, all of the perforating fluid may flow into the formation, thus enabling the drilling fluid to enter the perforations. Although filtration of the drilling fluid through the perforations may be decreased under these conditions in comparison to perforating with a hole full of drilling fluid at the time the perforations are made, there is still a substantial possibility of plugging the perforations by the mud solids. Even though the time required to perforate the well may be only a few hours, it is necessary to protect the perforations as long as well fluids containing insoluble solids capable of permanently plugging the perforations are standing in the well. In view of the need for controlling a well during other well completion jobs such as running tubing and pump, the hydrostatic head may have to be maintained in the well for as long as several days. A clean fluid which inherently has an appreciable fluid loss does not adequately protect the perforations for a sufficient length of time.

It is therefore an object of this invention to provide an improved method for completing a well. It is a more specific object of this invention to provide a method of perforating a well in which the permeability of a formation is not reduced by the liquids or solids in the well after the perforation has been produced.

In general and briefly stated, these objects are attained by perforating a well in the presence of a perforating fluid which is free of solids and liquids that tend to permanently plug the formation. Fluid loss to the formation through the perforation is temporarily restrained until the well is placed on production by employing a perforating fluid which is sufficiently heavy to control the well and contains solids which are soluble in and can be removed from the perforations by the fluids produced from the formation perforated.

More specifically this process comprises depositing a slurry of granular particles, which are soluble in formation fluids, in the well at the zone to be perforated, then perforating and carrying out any other operations which may be necessary to complete the well. Subsequently, the hydrostatic pressure in the well is reduced, for example by removing the fluids from the well to permit the formation fluids to flow into the well and dissolve the granular particles of bridging material.

In operation, a quantity of the slurry or perforating fluid calculated to fill the well to a level above the highest level to be perforated is deposited in the well. This placement may be made with a dump bailer or by pumping the fluid through a tubing which extends to the bottom of the zone to be filled with the fluid. When the well contains drilling fluid or other liquid having a density greater than the perforating fluid, it is necessary to adjust the density of the latter to prevent mixing of the two fluids in the column. Intermixing can be prevented by matching their densities. Additionally, the viscosity and gel strength of the perforating fluid may be increased to reduce fluid loss and improve its ability to hold the granular material in suspension.

Kerosene containing 6 pounds of napalm per barrel has a viscosity of 5000 centipoises and a density of 7 pounds per gallon. Napalm is a mixture of aluminum soaps which are capable of gelling numerous organic liquids. The chemical composition of napalm is described in U. S. Patent 2,390,609 Minich. The density of the kerosene gel may be increased by the addition of sand, galena, barytes or other high-density material. A gel having a density of 13 pounds per gallon and a viscosity of 5000 centipoises can be prepared without granular weighting agents by mixing 6 pounds of napalm per barrel of carbon tetrachloride. Gels having a density between 7 and 13 pounds per gallon may be prepared from napalm and blends of kerosene and carbon tetrachloride. Aqueous gels may be prepared with any of the common drilling fluid gelling agents such as starch, carboxymethyl cellulose, guar gum and the like.

Although finely-divided weighting agents may be used to increase the density of the perforating fluid, it is preferable to use granular materials having a particle size comparable with the bridging materials, that is, between 10 and 100 mesh. Finer particle sizes of these insoluble materials may enter the pores of the formation and reduce the perforating efficiency.

A dormant demulsifier or gel breaker may be added to the high viscosity fluid to assist the subsequent removal of the filtrate from the formation. In the case of aqueous gels, any of the well-known bacteria or enzymes capable of decomposing the gelling agent may be incorporated. Oil base gels such as napalm-kerosene gel may be broken with an agent such as benzotrichloride. This material is slowly hydrolyzed to produce hydrochloric acid which reacts with the napalm to destroy the gel properties and promote the flow of the fluid into the well.

The volume of the slurry placed in the well should be sufficient to extend from the bottom of the well, or a short distance below the lowermost level to be perforated, to a depth above the uppermost level to be perforated. Since there will be some filtration of this slurry in depositing the temporary bridging material in the perforations, the slurry should extend a sufficient distance above the interval to be perforated to prevent the mud or other fluid above the perforating fluid slurry from contacting the perforations. For example, one barrel of liquid will fill 43 feet of 5½ inch casing. If the fluid extends from about 3-4 feet below the zone to be perforated and assuming the maximum shrinkage due to filtration is 25 percent, one barrel of perforating fluid would be adequate for perforating a 30-foot interval in a 5½ inch casing. The shrinkage, i. e., decrease in volume due to filtration of the slurry during the deposition of the temporary bridging material in the perforations, is dependent upon the concentration and particle size of the solids in the perforating fluid as well as the number of perforations, the viscosity of the fluid, permeability of the formation and differential pressure across the perforations. For example, there will be a large volume of fluid filtering through the perforations when the slurry has a low solids content. Likewise the amount of filtrate will be high with low viscosity liquids and high permeability formations. Where the perforating device produces a high pressure in the vicinity of the perforation, there will be a high differential pressure tending to drive the well fluids through the perforations.

The temporary bridging material may be any solid which is readily removed by formation fluids and which does not become tacky or plastic in the presence of the well fluids or the perforating fluid. Materials which are made plastic by the solvent produce a coating on the formation which is impermeable to the solvent and retards further solvent action. On the other hand, granular particles which go into solution with the solvent, retain their granular shape whereby solvent may percolate through the bridge. The individual particles must have sufficient strength to resist crushing and plastic flow when there is a high pressure differential across the bridge. Examples of satisfactory granular solids which are soluble in most crude oils are naphthalene, paradichlorobenzene, anthracene, benzene hexachloride, and drip oil resins. Rock salt or other water-soluble granular materials may be used in the perforating fluid when the formation is known to contain substantial quantities of water which will remove the bridging material after the hydrostatic pressure is reduced and the formation fluids are permitted to flow into the well. These bridging materials are designated as temporary for the reason that they become ineffective as bridging materials when they are contacted by a fluid other than that of the slurry, for example, formation fluids.

An insoluble bridging material may be used in a temporary bridging material in combination with the soluble granular material. When formation fluids back-flow through a plug of such a composite mixture, the soluble granules dissolve and thereby dislodge the insoluble granules whereby the latter will be carried out of the perforation and into the well. Particularly suitable insoluble materials are ground nutshells, e. g., black walnut and coconut. Also ground fruit pits such as those of the peach, cherry, plum and apricot are suitable. The use of granular bridging materials for controlling fluid loss to permeable formations is described by Howard et al. in Trans. AIME (1951), 192, 171. The ratio of soluble to insoluble bridging material may be as low as 1:1; however, I prefer to use a ratio of about 1.5:1 to about 2.5:1 to insure complete removal of the plugging materials from the perforations.

The particle sizes of the granular bridging or plugging materials should be within the ranges shown in Table I.

*Table I.—Sieve analysis (mesh)*

| Through— | Retained on— | Percent Present |
| --- | --- | --- |
|  | 4 | Not more than 1. |
| 4 | 10 | 0 to 75. |
| 10 | 40 | 15 to 90. |
| 40 | 100 | 10 to 80. |
| 100 |  | Not more than 10. |

Bridging materials having these ranges of particle sizes are known to produce substantially impermeable bridges and will support high differential pressures when the individual particles are sufficiently resistant to plastic deformation and crushing.

The liquid phase of the slurry should be saturated with the soluble component of the bridging material. Otherwise, the plug will be unstable due to the gradual solution of the soluble granules by the liquid. From about 5 to about 100 pounds of undissolved bridging material per barrel of perforating fluid may be used; however, I prefer to employ from about 25 to about 75 pounds per barrel. The granular bridging material which is insoluble in formation fluids may be used in concentrations from 0 to about 50 pounds per barrel.

The clean liquid used in preparing the slurry with the temporary bridging material may be crude oil, kerosene or fuel oil. Water may be used where the productive formations are not adversely affected by it. Oil-water emulsions such as those prepared for drilling fluids may be used. When an oil base or emulsion drilling fluid is used as the clean liquid, it should be free of dispersed clay or other finely-divided insoluble materials as well as plastic materials such as asphalt. Halogenated hydrocarbons such as carbon tetrachloride may be used to prepare slurries having densities substantially higher than those prepared with hydrocarbon liquids. Gelling agents may be added to the clean liquid to retard the settling of the dispersed granular particles. Additionally, it is desirable for the liquid to have a low fluid loss in order that there will be a minimum loss of liquid through the bridge of granular particles.

After the slurry of perforating fluid has been placed in the well, the perforating gun is lowered into position, fired and removed from the well. Following this operation the liquids are removed from the well to enable reservoir fluids to enter through the perforations. This influx of fluid dissolves and dislodges the bridging materials whereby the perforations are cleared of obstructions to the flow of fluid.

Tests conducted with various perforating fluids illustrate the advantages of perforating in the presence of a fluid which produced a temporary bridge in the perforations. In these tests a Berea sandstone core was confined in a section of 4-inch casing by Wood's metal. One end of the mounted core was exposed and the other was sealed on the outside of a section of 5½ inch casing with a cement sheath between the end of the sandstone core and the casing. To simulate reservoir conditions, the core was saturated with oil before the test. The interior of the 5½ inch casing was filled with the fluid to be evaluated and the pressure on the fluid raised to 1000 p. s. i. at a temperature of 80° F. A jet perforating charge positioned within the casing was fired through the wall of the casing and into the sandstone core.

Prior to the actual perforating step, preliminary measurements of the core properties were made. The original permeability was determined by flowing oil from the exposed or formation end to the well bore end of the core. After the perforating step, the core was removed from the apparatus and oil was again flowed through from the formation to the well side until the flow rate became stabilized. Permeability measurements were made at that time. Next, the length of the core which was not penetrated by the perforating charge was cut off and the permeability of this unperforated portion was measured. Subtracting that value from the measured permeability of the entire core following the perforation step gives the permeability of the perforated portion of the core. A similar calculation was used to determine the permeability of the perforated portion before it was perforated.

The following formulae were used in computing the results of these tests:

$$K_{PB} = \frac{L_P}{\dfrac{L_T}{K_{TB}} - \dfrac{L_U}{K_U}}$$

$$K_{PA} = \frac{L_P}{\dfrac{L_T}{K_{TA}} - \dfrac{L_U}{K_U}}$$

Perforating efficiency, percent $= \left(1 - \dfrac{K_{PB}}{K_{PA}}\right) \times 100$ where:
$K_{PB}$=calculated permeability of perforated portion before perforating
$K_{PA}$=calculated permeability of perforated portion after perforating
$K_{TB}$=permeability of total core before perforating
$K_{TA}$=permeability of total core after perforating
$K_U$=permeability of unperforated portion
$L_T$=total length of core
$L_U$=length of unperforated portion of core
$L_P$=depth of perforation From the formula for perforating efficiency it will be seen that when $K_{PA}$ is equal to $K_{PB}$, perforating efficiency is zero. When $K_{PA}$ is less than $K_{PB}$, the calculated perforating efficiency has a negative value. The measurement of negative efficiencies is understandable since the test method measures the effective permeability of the sandstone surrounding the perforation rather than the permeability of the perforation. On the other hand, perforating efficiency approaches 100 percent as $K_{PA}$ approaches infinity. The results of these tests are shown in Table II.

Table II

| Calculated Perforating Efficiency | Composition of Perforating Fluid |
|---|---|
| +37% | Clean Kerosene. |
| −35% | Gulf Coast natural mud. |
| −15% | CCl₄ containing 6% napalm. |
| +20% | CCl₄ containing 6% napalm and 50 lb./bbl. benzene hexachloride granules (4-100 mesh). |

The data in Table II indicate clean kerosene should be most favorable; however, it is undesirable due to the high fluid loss of the kerosene. Eventually the drilling fluid above the clean kerosene contacts the perforations, deposits clay and other insoluble materials in the perforations and produces a permanent reduction in permeability.

The deleterious effect of finely-divided, insoluble solids is illustrated by the results obtained using the Gulf Coast natural mud as the perforating fluid. The low efficiency of −35 percent indicates there was a substantial invasion of the mud solids into the test core.

The −15 percent efficiency experienced with the CCl₄-napalm gel demonstrates the damage which may result from the uncontrolled invasion of a highly viscous fluid. Since the oil flush prior to the measurement of $K_{PA}$ did not restore the permeability, it is unlikely that the obstruction produced by the gel could be removed by the natural flow of formation fluids into a well.

Fifty pounds of soluble bridging material per barrel of gel appears to have prevented the invasion of the core by appreciable quantities of the gel. Although a higher efficiency was obtained with clean kerosene as the perforating fluid, the additional pressure control with the low fluid loss material and the greater protection of the perforations against plugging by insoluble solids are of greater importance. It is unlikely that the +37 percent efficiency with clean kerosene could be realized under actual field conditions because mud solids would enter the perforations after the kerosene had leaked into the formation. The +20 percent efficiency probably could be experienced when a temporary plugging material is used in a low fluid loss liquid since the mud solids would not contact the perforations.

While the preferred embodiment is applied to the use of a perforator inside the cased section of a well, the method applies equally well to stimulation methods where perforations are made in the open hole or uncased section of the well to increase productivity.

In addition to the impairment to flow of fluid produced by the insoluble solids which are forced into the pores of the formation by the high pressure, there may be some impairment due to the emulsification of oil and water within the oil-bearing zone. A demulsifying agent may be added to the perforating fluid to aid in breaking emulsions which might be contacted by the filtrate. There are numerous demulsifiers in general use for breaking oil field emulsions which would be suitable for this purpose. One particularly effective agent is the polyoxyethylated sorbitol ester of cottonseed oil. An oil solution containing from 0.1 to 1.0 percent by weight of this surface-active agent will break most oil field emulsions. The customary method for determining the most effective demulsifier and the optimum concentration is to test the various materials with samples of emulsions from the reservoir to be perforated. Such samples are usually available from adjacent wells.

It is to be understood that this invention is not limited by the specific examples cited but includes equivalents and obvious modifications thereof. Having described my invention, what I wish to claim is:

A method for perforating casing in a well penetrating a petroleum-bearing formation comprising the steps of placing a slurry of granular solids throughout the interval of said casing to be perforated, said granular solids being soluble in the fluids within said formation, imposing a pressure on said slurry greater than the natural formation pressure, perforating said casing within said interval, and subsequently reducing the pressure on said slurry to permit fluid flow from said formation through said perforations.

References Cited in the file of this patent

UNITED STATES PATENTS

| | | |
|---|---|---|
| 2,718,264 | Allen et al. | Sept. 20, 1955 |
| 2,734,861 | Scott et al. | Feb. 14, 1956 |